US007536366B2

United States Patent
Church et al.

(10) Patent No.: US 7,536,366 B2
(45) Date of Patent: May 19, 2009

(54) CONTINGENCY TABLE ESTIMATION VIA SKETCHES

(75) Inventors: Kenneth Ward Church, Seattle, WA (US); Ping Li, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/319,992

(22) Filed: Dec. 28, 2005

(65) Prior Publication Data

US 2007/0136225 A1 Jun. 14, 2007

Related U.S. Application Data

(60) Provisional application No. 60/717,316, filed on Sep. 15, 2005.

(51) Int. Cl.
*G06E 1/00* (2006.01)

(52) U.S. Cl. ............................. 706/15; 706/21; 706/62; 707/5; 707/6

(58) Field of Classification Search ..................... 707/6; 706/21, 62

See application file for complete search history.

(56) References Cited

U.S. PATENT DOCUMENTS

| | | | | |
|---|---|---|---|---|
| 6,311,173 | B1 * | 10/2001 | Levin et al. ................... | 706/21 |
| 6,629,097 | B1 * | 9/2003 | Keith ............................ | 707/5 |
| 6,640,228 | B1 * | 10/2003 | Handerson et al. ............ | 707/6 |
| 6,687,696 | B2 * | 2/2004 | Hofmann et al. ............... | 707/6 |

* cited by examiner

*Primary Examiner*—Hosain T Alam
*Assistant Examiner*—Ann J Chempakaseril
(74) *Attorney, Agent, or Firm*—Amin, Turocy & Calvin, LLP

(57) ABSTRACT

Systems and methods that enhance estimate(s) of features (e.g., word associations), via employing a sampling component (e.g., sketches) that facilitates computations of sample contingency tables, and designates occurrences (or absence) of features in data (e.g., words in document lists). The sampling component can further include a contingency table generator and an estimation that employs a likelihood argument (e.g., partial likelihood, maximum likelihood, and the like) to estimate features/word pair(s) associations in the contingency tables.

10 Claims, 10 Drawing Sheets

CONTINGENCY TABLE ESTIMATION VIA SKETCHES

CROSS-REFERENCE TO RELATED APPLICATIONS

This is an application claiming benefit Under 35 U.S.C. 119(e) of U.S. Provisional Application No. 60/717,316 filed on Sep. 15, 2005, entitled, "USING SKETCHES TO ESTIMATE CONTINGENCY TABLES", the entirety of which is hereby incorporated by reference as if fully set forth herein.

BACKGROUND

Memory storage expansion and processing capabilities of computers have enabled massive amounts of data to be accumulated and analyzed by complex and intelligent algorithms. For instance, given an accumulation of data, algorithms can analyze such data and locate patterns therein. Such patterns can then be extrapolated from the data, persisted as content of a data mining model or models, and applied within a desired context. With the evolution of computers from simple number-crunching machines to sophisticated devices, numerous services are supplied for data trending and analysis.

Usage for such data analysis tools has increased dramatically as society has become more dependent on databases and similar digital information storage mediums. Such information is typically analyzed, or "mined," to learn additional information regarding customers, users, products, and the like.

For example, data mining can be employed in searching through large amounts of data to uncover patterns and relationships contained therein. In the data mining world, there are at least two operations that are performed with data indicated by the client. These operations are training (finding patterns in client data) and prediction (applying such patterns to infer new/missing knowledge about client data). Moreover, data mining can be employed to explore large detailed business transactions, such as pairing up items for sale or "associative selling", wherein businesses desire to correlate various product names based upon a particular buyer's buying habits. Such associative process can also be expanded beyond direct product sales. It can be utilized indirectly to enhance search capabilities in conjunction with word queries.

Word associations (e.g., co-occurrences or joint frequencies) have a wide range of applications including: Speech Recognition, Optical Character Recognition and Information Retrieval (IR). Although associations can be readily performed for a small corpus, yet computing plurality of scores for numerous data such as the Web, can become a daunting challenge (e.g., having billion number of web pages and millions of word types.) For example, for a small corpus, one could compute pair-wise (two-way) associations by multiplying the (0/1) term-by-document matrix with its transpose. Yet, such an approach can become infeasible at Web scale. Furthermore, the computation and storage cost can increase exponentially for multi-way associations.

Although deriving associations among data (e.g., word search queries) is extremely advantageous, it is also generally very difficult to actually determine such associations. Typically, the difficulty for deriving such associations is in part due to factors such as: complex computing requirements, complexity in accessing and retrieving the necessary information, and/or long computational calculation times, and the like. In general, a process reviews the data and examines patterns in the data, along with the frequency in which the patterns appear. These patterns, in turn facilitate determining "association rules", which can be further analyzed to identify the likelihood for predicted outcomes—given a particular set of data.

For large amounts of data, the review process to determine association rules often requires searching entire document collections and employing large amounts of memory. It is common for all available memory to be utilized before all of the data has been reviewed. This causes decreased performance in operations of computer systems.

Estimates can provide a suitable approach to mitigate a requirement to examine every document to determine whether two words are strongly associated or not. Web search engines can produce estimates of page hits. For example, hits for two high frequency words "a" and "the" can yield a large number of web pages (D) $D=10^{10}$ for English documents. Accordingly, one can employ estimated co-occurrences from a small sample to compute the test, statistics, most commonly the Pearson's Chi-squared test, the likelihood ratio test, the Fisher's exact test, as well as some non-statistical metrics such as cosine similarity or resemblance, also widely used in computational Linguistics and Information Retrieval.

The conventional sampling method randomly selects D, documents from a collection of size D and counts the word co-occurrences within the sample. In terms of the term-by-document matrix, which has M rows (M an integer indicating the number of word types) and D columns, the conventional sampling randomly selects a number of documents ($D_s$) columns. As such, typically all words are sampled at a same rate. For example, such sampling rate is not higher for words considered interesting to a user, and lower for words considered less interesting to a user.

Therefore, there is a need to overcome the aforementioned exemplary deficiencies associated with conventional systems and devices.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation provides for systems and methods that enhance estimate(s) of features (e.g., word associations), via employing a sampling component that facilitates computations of sample contingency tables, and designates occurrences (or absence) of features in data (e.g., words in document list(s)). The sampling component can include a non-random sampling feature to obtain a sketch or representation of data and/or words. Such sketch can then be employed for constructing contingency tables, wherein an estimation component utilizes a likelihood argument (e.g., partial likelihood, maximum likelihood, and the like) to estimate features (e.g., word pair(s) associations) for generated contingency tables. Moreover, stopping rules for sample size selection can be based on such likelihood arguments.

Accordingly, a more general sampling method (e.g., with non-random sampling as opposed to conventional random sampling methods) can be provided, wherein the estimations associated therewith are based on likelihood. The sampling component can also employ a variable rate of sampling depending on search criteria (e.g., rareness or prominence of word usage). Thus, a typical requirement to examine an entire document (or list of documents) to determine whether two words are associated can be mitigated.

In one exemplary aspect, a contingency table in a sketch space is initially computed. Such contingency table can include a plurality of cells that form a matrix of integers, which designate occurrences (or absence) of words within documents. Subsequently, a maximum likelihood argument can be employed to locate the most likely contingency table in the original space, while at the same time considering estimate associations, and the already imposed constraints (e.g., presence or absence of words in a document, number of occurrences, frequency of occurrences, and the like). Therefore, an entire document list need not be examined, and associations between data can be readily determined via the sampling component.

According to a further aspect, the subject innovation constructs sample contingency table(s) (e.g., a matrix of integers) from sketches, thus connecting powerful sketch techniques with conventional statistical methods. As such, conventional statistical techniques (e.g., maximum likelihood estimation—MLE), and large sample theory can be employed to analyze estimation errors (e.g., variances). Therefore, the contingency table construction of the subject innovation also enables statistical hypothesis testing (e.g., $X^2$ test or $G^2$ test, or multiple testing, and the like.)

In a related aspect, to estimate associations between word $W_1$ and word $W_2$, the subject innovation employs a likelihood function that leverages constraints such as: the size of the collection D (e.g., total number of documents in the collection); the margin (length of posting lists) $f_1=a+b$, (wherein "a" is the number of documents that contain both $W_1$ and $W_2$, and "b" is the number of documents that contain $W_1$ but not $W_2$); the margin $f_2=a+c$, (wherein "c" is the number of documents that contain $W_2$ but not $W_1$); and D=a+b+c+d (wherein "d" is the number of documents that contain neither $W_1$ nor $W_2$). Likewise $a_s$, $b_s$, $c_s$, $d_s$ correspond to a sample contingency table in a sample space s. Various artificial intelligence components can also be employed in conjunction with estimating associations for the word pairs.

According to a further aspect, the subject innovation can employ an enhanced sampling (e.g., non-randomized sampling), in conjunction with maximum likelihood estimation, wherein $a_s=a \cdot s$ (s being a sampling rate). Hence, in contrast to conventional methods, (e.g., $a_s=a \cdot s^2$) the subject innovation supplies a more dynamic range on a cell of a contingency table (e.g., a cell with smallest counts.) By enhancing the sampling procedure, the subject innovation can facilitate obtaining a better resolution, even though a more complex estimation can be required (e.g., a likelihood argument.)

To the accomplishment of the foregoing and related ends, certain illustrative aspects of the claimed subject matter are described herein in connection with the following description and the annexed drawings. These aspects are indicative of various ways in which the subject matter can be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
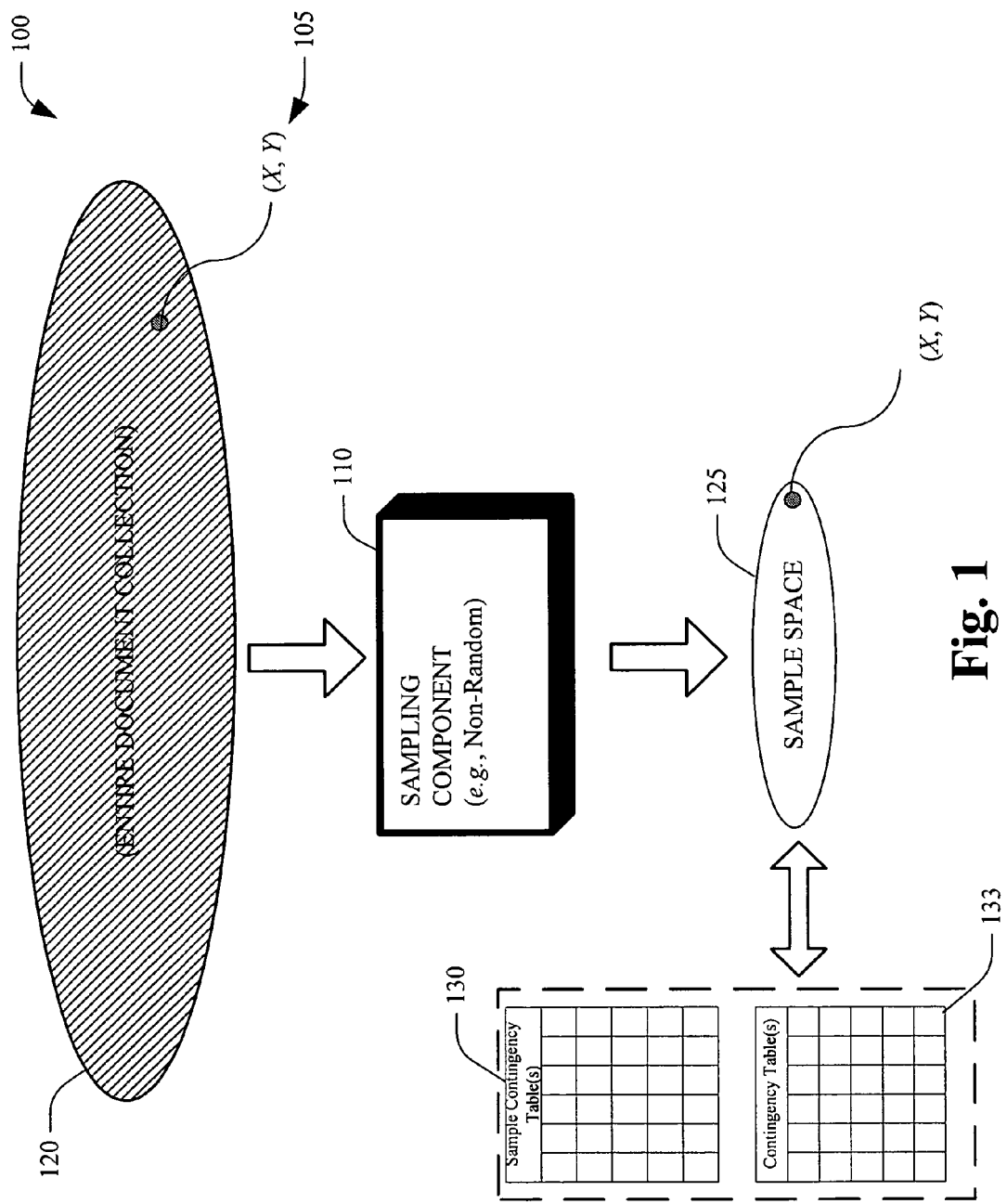
FIG. 1 illustrates a sampling component that operates on an original space of data, to form a sketch space.

Turning initially to FIG. 1, a system 100 is illustrated that enhances estimates of association for a word pair 105, via employing a sampling component 110 with non-random capabilities to construct sample contingency table(s) 130. The sampling component 110 can sample the data according to a predetermined rate, to mitigate a requirement to examine an entire document (or list of documents) for determining whether two words are associated. As such, the space 120 can be sampled to form a sample space 125. The sampling component 110 can include non-random features and/or a varying sampling rate, to provide for a flexible sampling rate depending on search criteria (e.g., rareness or prominence of word usage).

Accordingly, a more general sampling method (e.g., with non-random sampling as opposed to conventional random sampling methods) can be provided, wherein the estimations associated therewith are based on likelihood. Thus, a typical requirement to examine an entire document (or list of documents) to determine whether two words are associated can be mitigated. The sample contingency table 130 in a sketch space is initially computed. Such contingency table 130 can include a plurality of cells that form a matrix of integers, which designate occurrences (or absence) of words within documents. Subsequently, a maximum likelihood argument can be employed to locate the most likely contingency table 133 in the original space, while at the same time considering estimate associations, and the already imposed constraints (e.g., presence or absence of words in a document, number of occurrences, frequency of occurrences, and the like). Therefore, associations between data can be readily determined via the sampling component.

Figure 2:
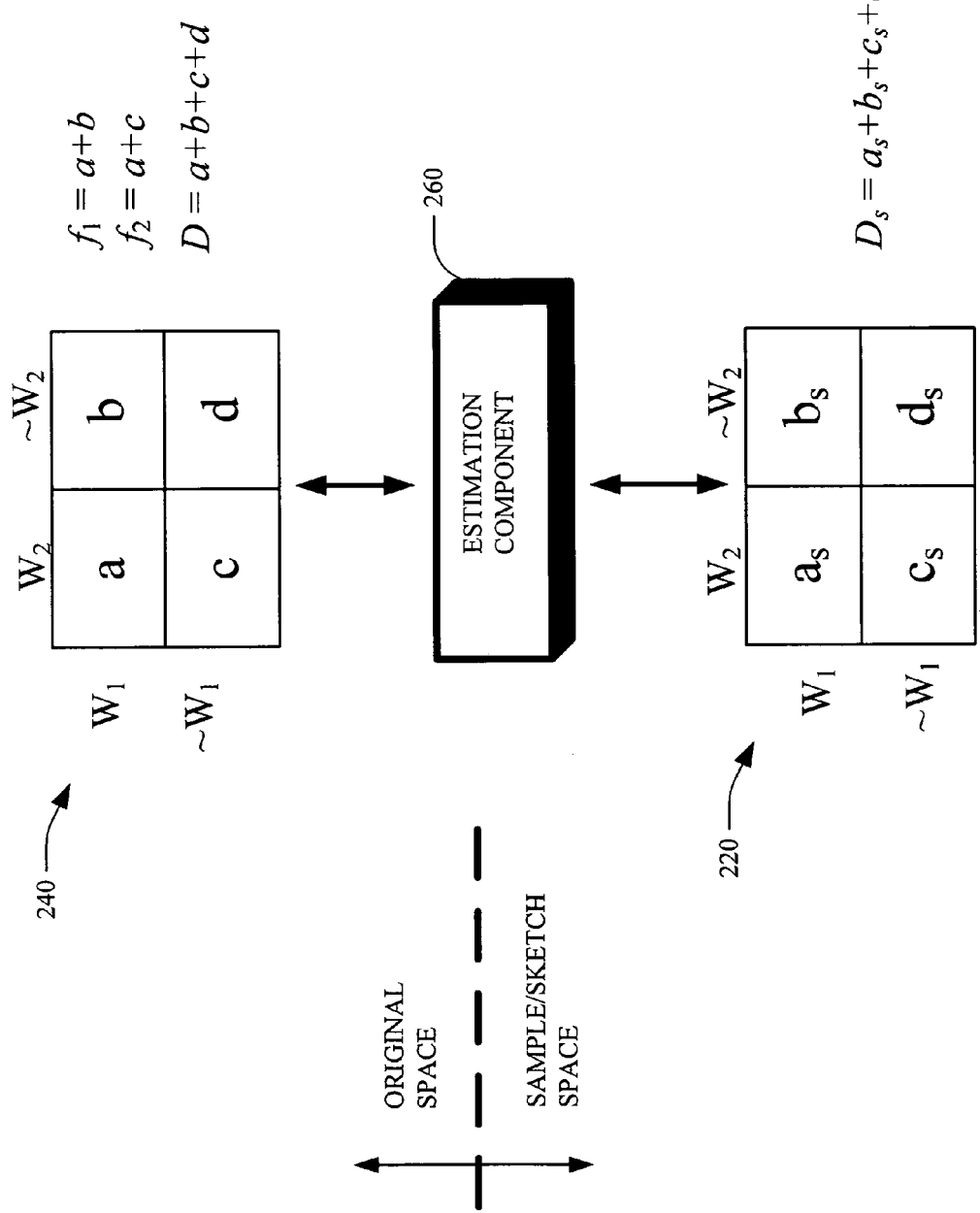
FIG. 2 illustrates estimate tables from margins and samples in accordance with an aspect of the subject innovation.

Referring now to FIG. 2, there is illustrated two way associations represented as two-way contingency tables. The subject innovation can construct the sample contingency table 220 and estimate the contingency table 240 from table 220, via an estimation component 260. The estimation component 260 as described in detail infra can employ a likelihood argument (e.g., partial likelihood, maximum likelihood, and the like). By enhancing the sampling procedure, the subject innovation can facilitate obtaining a better resolution, even though a more complex estimation can be required (e.g., a likelihood argument.)

In one exemplary aspect, a standard inverted index can be considered. For example for the word $W_1$, a set of postings $P_1$ ($P_1$ being an integer) can exist that contain a set of document IDs, such as one for each document containing $W_1$. Moreover, the size of the posting $f_1 = |P_1|$ can correspond to the margins of the contingency table 240, also known as document frequencies (df) in information retrieval (IR). Such posting lists can be estimated by sketches K. Assuming that document IDs are random (e.g., obtained by random permutations) $K_1$ can then be computed as a random sample of $P_1$, by selecting the first few elements of $P_1$.

As depicted in FIG. 2, considering the words $W_1$, $W_2$, a is the number of documents that contain both $W_1$, $W_2$. Likewise, b is the number is the number of documents that contain $W_1$ but not $W_2$, and c is the number of documents that contain $W_2$ but not $W_1$. Also, d is the number of documents that contain neither $W_1$ nor $W_2$ As will be described in detail infra, a likelihood function associated with the estimation component 260 can leverage constraints such as: the size of the collection D (e.g., total number of documents in the collection a+b+c+d), the margin (length of posting lists) $f_1$=a+b, and the margin $f_2$=a+c. Thus, the sample contingency table 220 can include a plurality of cells that form a matrix of integers, which designate occurrences (or absence) of words within documents. Subsequently, a maximum likelihood argument, as described in detail infra, can be employed to locate the most likely contingency table in the original space, while at the same time considering estimate associations, and other already imposed constraints (e.g., presence or absence of words in a document, number of occurrences, frequency of occurrences, and the like). Therefore, an entire document list need not be examined, and associations between data can be readily determined via the sampling component 260 that can employ non-random methodologies. To facilitate description and for further appreciation of the subject innovation, a conventional sketch algorithm known in the art as "Broder" method is initially described below, and the enhancements upon such algorithm by the subject innovation in conjunction with contingency tables is subsequently described.

In general, sketches are conventionally designed to find duplicate pages for a web crawling application. The similarity of two web pages is typically defined in terms of resemblance (R). In the Broder method, it can be assumed that each document in the corpus of size D is assigned a unique ID between 1 and D. $P_1$, the postings for word $W_1$ is a sorted list of $f_1$ document IDs. Similarly, $P_2$ denotes the postings for word $W_2$. Initially, a random permutation can be performed on the document IDs and the smallest IDs in the postings $P_1$ and $P_2$, (denoted as $MIN(P_1)$ and $MIN(P_2)$, respectively) recorded. As such, the possibility of $MIN(P_1)=MIN(P_2)$ can $$be\ |P_1 \cap P_2|\ out\ of\ |P_1 \cup P_2|,\ e.g., \qquad (eq.\ 1)$$
$$P(MIN(P_1) = MIN(P_2)) = \frac{|P_1 \cap P_2|}{|P_1 \cup P_2|} = R(W_1, W_2),$$

Therefore, the resemblance of $W_1$ and $W_2$, e.g., $$R(W_1, W_2) = \frac{|P_1 \cap P_2|}{|P_1 \cup P_2|},$$

and can be estimated in an unbiased manner by repeating the permutation k times independently, in a straightforward manner:

$$\hat{R}_{B,r} = \frac{\#\{MIN(P_1) = MIN(P_2)\}}{k} \qquad (eq.\ 2)$$

Accordingly, Broder's original sketch algorithm employs typically only one permutation on the document IDs. After the permutation, the postings $P_1$ can be sorted ascending, and the sketch, $K_1$ is then the first (smallest) $k_1$ document IDs in $P_1$. The Broder method employs $MIN_k(Z)$ to denote the k smallest elements in the set, Z. Thus, $K_1=MIN_{k_1}(P_1)$, and $K_2$ denotes its sketch, $MIN_{k_2}(P_2)$. Moreover, the Broder method restricted $k_1=k_2=k$, and estimated the resemblance by $$\hat{R}_B = \frac{MIN_k(K_1 \cup K_2) \cap K_1 \cap K_2}{|MIN_k(K_1 \cup K_2)|}, \qquad (eq.\ 3)$$

and proved $E(\hat{R}_B)=R$.

Using the notation in FIG. 2, a=$|P_1 \cap P_2|$. One can divide the set $P_1 \cup P_2$ (of size $f_1+f_2-a$) into two disjoint sets: $P_1 \cap P_2$ and $P_1 \cup P_2 - P_1 \cap P_2$, whose sizes are a and $f_1+f_2-a-a=b+c$, respectively. Within the set $MIN_k(K_1 \cup K_2)$ (of size k), the document IDs that belong to $P_1 \cap P_2$ can be $MIN_k (K_1 \cup K_2) \cap K_1 \cap K_2$, whose size is denoted by $a_s^B$. As such, a hypergeometric sample can be obtained, e.g., sampling k document IDs from $P_1 \cup P_2$ randomly without replacement and obtaining $a_s^B$ IDs that belong to $P_1 \cap P_2$. By the property of the hypergeometric distribution the expectation of $a_s^B$ can be $$E(a_s^B) = \frac{ak}{f_1 + f_2 - a} \Rightarrow E\left(\frac{a_s^B}{k}\right) \quad \text{(eq. 4)}$$
$$= \frac{a}{f_1 + f_2 - a}$$
$$= \frac{|P_1 \cap P_2|}{|P_1 \cup P_2|} \Rightarrow E(\hat{R}_B)$$
$$= R.$$

Such sketch (miniwise sketch) can be considered as a "sample-with-replacement" version of the original sketch. In $\hat{R}_{B,r}$, the additional subscript r indicates "sample-with-replacement."

Since the "miniwise" sketch is a binomial sample and the "original" sketch is a hypergeometric sample, the associated variances can be written as:

$$\text{Var}(\hat{R}_{B,r}) = \frac{1}{k} R(1-R), \quad \text{(eq. 5)}$$
$$\text{Var}(\hat{R}_B) = \frac{1}{k} R(1-R) \frac{(f_1 + f_2 - a) - k}{(f_1 + f_2 - a) - 1}.$$

wherein the term $$\frac{(f_1 + f_2 - a) - k}{(f_1 + f_2 - a) - 1}$$

is often referred to as the "finite population correction factor".

When k is not too large and in terms of accuracy, the difference between the two sketch constructions can be very small, given the same sketch size. Once the resemblance R is estimated, one could estimate the original contingency table in FIG. 2 from the estimated resemblance and known margins as:

$$\hat{a}_B = \frac{\hat{R}_B}{1 + \hat{R}_B}(f_1 + f_2) \quad \text{(eq. 6)}$$

$\hat{a}_B$ does not make full use of the sample, and eq. 3 indicates that only k samples are employed in the estimation while the total number of samples are 2×k. Some of the discarded samples can include useful information. In contrast, according to an exemplary aspect of the subject innovation all useful samples can be employed. As such, and since the estimation variances (errors) are often inverse proportional to the sample size, the subject innovation can typically supply twice an accuracy of $\hat{a}_B$ as compared to Broder algorithm described above. The subject innovation also provides for advantages such as additional flexibility (e.g., mitigating a requirement of $k_1 = k_2$)

Figure 3:
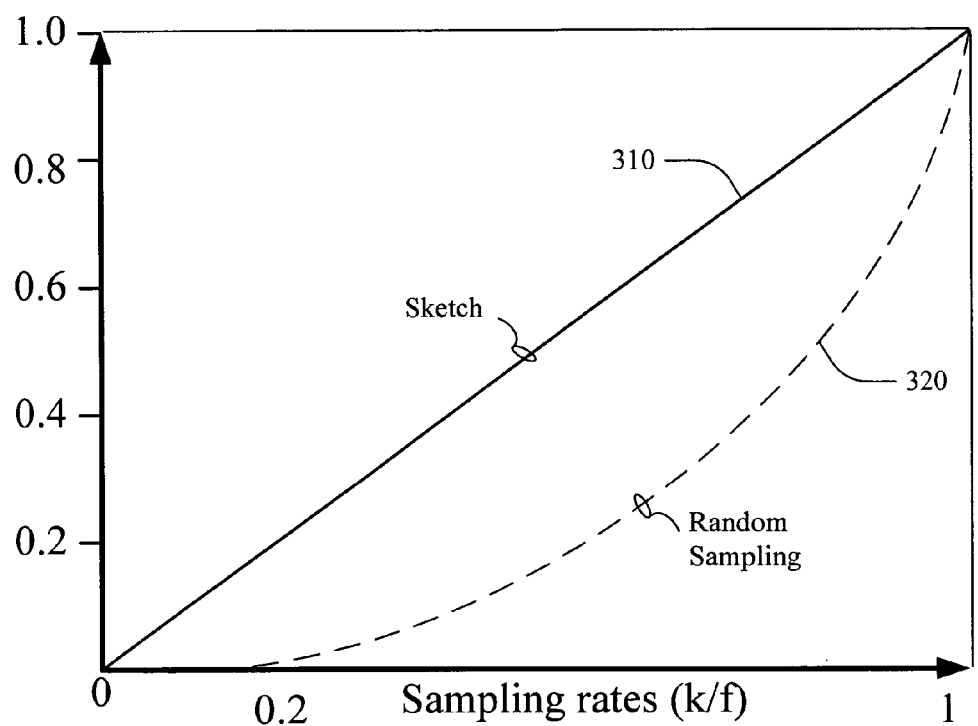
FIG. 3 illustrates an exemplary graph that compares percentage of intersections that employ sketches according to a particular aspect of the subject innovation and conventional methods of random sampling.

FIG. 3 illustrates the effectiveness of sketches, when compared to a random sampling for two postings and an intersect of the samples to estimate associations. For example, a random sample of size k from $P_1$ (denoted as $Z_1$), and a random sample $Z_2$ of size k from $P_2$ can be obtained. Assuming $a_s^Z = Z_1 \cap Z_2$, and $f_1 = f_2 = f$ for simplicity, it is apparent that $$E\left(\frac{a_s^Z}{a}\right) = \frac{k^2}{f^2}$$

which is represented by the dashed curve 320 in FIG. 3. In contrast, with sketches $K_1$ and $K_2$ (k smallest IDs in $P_1$ and $P_2$, respectively), $a_s = |K_1 \cap K_2|$, one can obtain $$E\left(\frac{a_s}{a}\right) \approx \frac{k}{f},$$

(held with very good accuracy) as shown by the solid curves 310 FIG. 3. Therefore, by comparing the percentage of intersections, $$E\left(\frac{a_s^Z}{a}\right) \text{ and } E\left(\frac{a_s}{a}\right),$$

the sketch can supply a significant improvement over sampling over postings. Moreover, the difference between $$\frac{k}{f} \text{ and } \frac{k^2}{f^2}$$

becomes particularly important at low sampling rates.

As explained earlier, FIG. 3 illustrates an exemplary graph that compares percentage of intersections that employ sketches compared with methods of random sampling. The line labeled 310 indicates a linear sampling rate (e.g., sketches) that dominated the dashed graph 320, which represents conventional random sampling. As illustrated and by comparing the percentage of intersections, it is readily apparent that sketches depicted by 310 dominate random sampling 320. As illustrated, there exists one dashed curve 320 across all values of a, yet a plurality of indistinguishable solid curves depicted by graph 310 depending on a.

Thus, the subject innovation enables an enhanced sampling (e.g., non-randomized sampling), in conjunction with maximum likelihood estimation, wherein $a_s = a \cdot s$ (s being a sampling rate). Hence, in contrast to conventional methods, (e.g., $a_s = a \cdot s^2$) the subject innovation supplies a more dynamic range on a cell of a contingency table (e.g., a cell with smallest counts.) Moreover, by enhancing the sampling procedure, the subject innovation can facilitate obtaining a better resolution, even though a more complex estimation can be required (e.g., a likelihood argument.)

Figure 4:
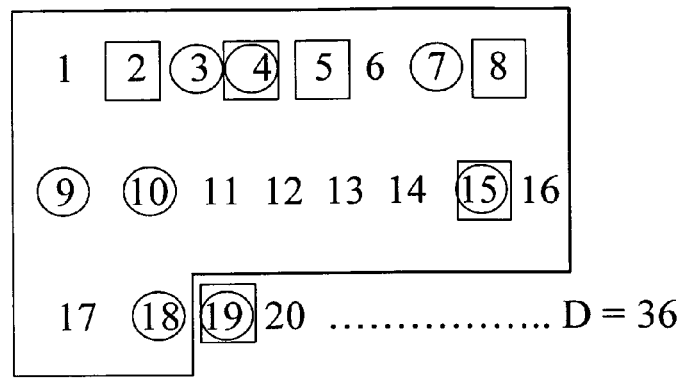
FIGS. 4-6 illustrate examples of sample contingency table construction, in accordance with a particular aspect of the subject innovation.
Figure 5:
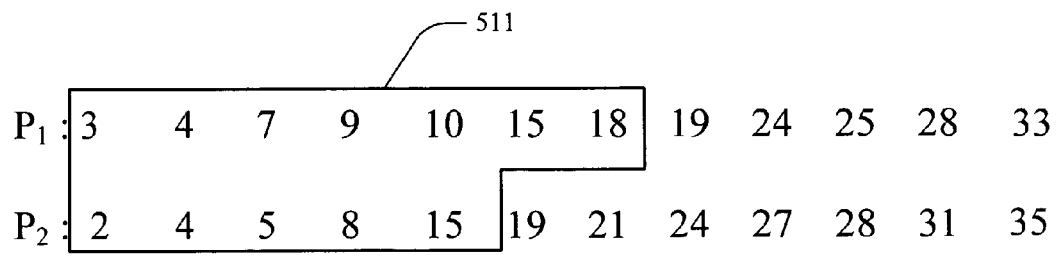
Figure 6:
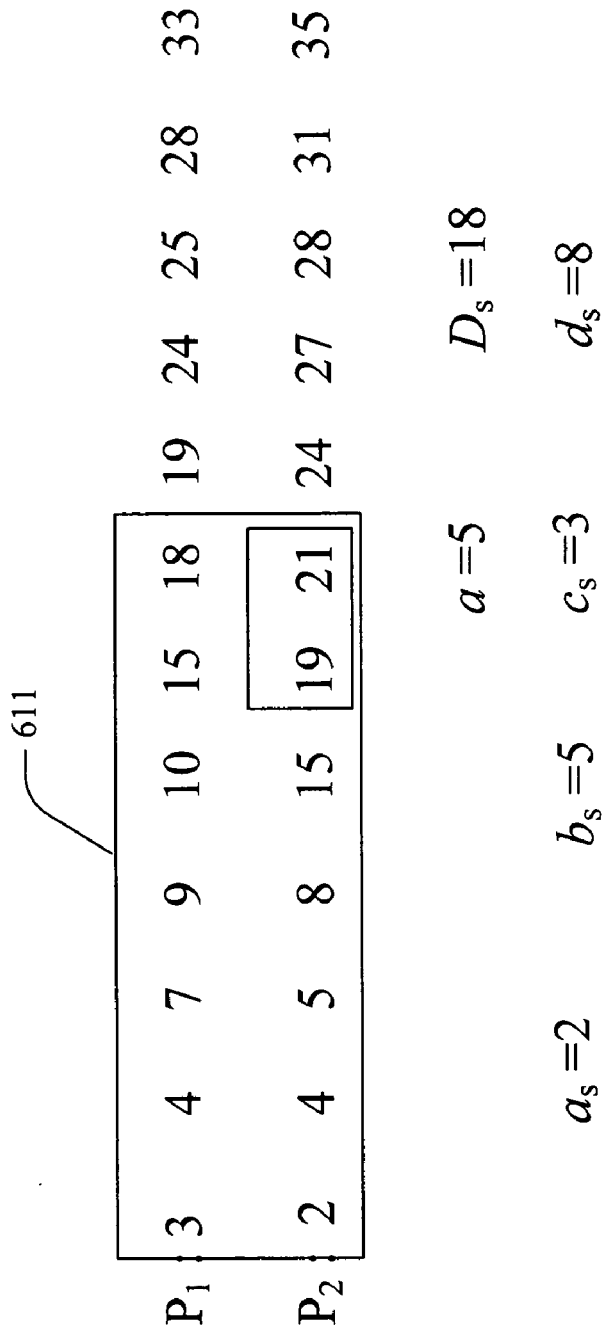

FIGS. 4-6 illustrate examples of sample contingency table construction. In the corpus of FIG. 4, there are D=36 documents numbered from 1 to 36 and sorted ascending. By choosing a (corpus) sampling rate of 50%, then $D_s$=18. Since document IDs are assumed random, the first 18 documents can be picked. Assuming there is interest in word $W_1$ and word $W_2$, then the documents that contain $W_1$ are marked in small circles, and documents that contain $W_2$ are marked in small squares, as depicted in FIG. 4. Subsequently, a sample contingency tables for word $W_1$ and word $W_2$ can be constructed as:

$$a_s=|\{4,15\}|=2, b_s=|\{3, 7, 9, 10, 18\}|=5, c_s=|\{2, 5, 8\}|=3, d_s=|\{1, 6, 11, 12, 13, 14, 16, 17\}|=8$$

FIG. 5 illustrates a procedure that employs sketches to construct the same sample contingency table as conventional sampling, using the same example in FIG. 4. In this procedure, samples are supplied from the beginning of the postings $P_1$ and $P_2$. In order to equivalently sample the first $D_s=18$ documents, all IDs in both sketches that are smaller than or equal to 18 are sampled. After obtaining such samples $a_s$, $b_s$, $c_s$ and $d_s$ can be computed to construct the sample contingency table, which is identical to the example in FIG. 4. Put differently, as the document IDs in the postings are sorted ascending, one only needs to sample from the beginnings of $P_1$ and $P_2$ for IDs$\leq D_s=18$, as illustrated in the boxed area 511. The sampling procedure produces a sample contingency table: $a_s=2$, $b_s=5$, $c_s=3$ and $d_s=8$, identical to the example in FIG. 4.

Such procedure takes advantage of the fact that the document IDs span the integers from 1 to D with no gaps. When the two sketches that include all documents IDs smaller than or equal to $D_s$ are compared, one has effectively looked at $D_s$ documents in the original collection.

When sketches are constructed off-line for all words in a corpus, it is possible that $D_s$ is not known in advance. Moreover, it can be desirable to effectively vary $D_s$ for different word pairs. For on-line sketch construction, it is also much easier to sample according to the postings sampling rate $$\left(\frac{k}{f}\right)$$

as opposed to the corpus sampling rate $$\left(\frac{D_s}{D}\right),$$

because during sampling one does not want to compare samplings against $D_s$.

Accordingly, a different sketch construction that does not require knowing $D_s$ in advance is illustrated in FIG. 6. In such procedure, sketches are built according the postings sampling rate, or equivalently, the pre-specified sketch sizes ($k_1$, $k_2$). The last elements in $K_1$ and $K_2$ are respectively denoted as $K_{1(k_1)}$ and $K_{2(k_2)}$, using the standard "order statistics" notation (e.g., $K_{(j)}$ is jth smallest element in K). One can treat $D_s$=min ($K_{1(k_1)}$, $K_{2(k_2)}$) and trim all documents IDs in $K_1$ and $K_2$ that are larger than $D_s$, wherein:

$$D_s = \min\{K_{1(k_1)}, K_{2(k_2)}\}, \quad (eq.\ 7)$$
$$k'_1 = k_1 - |\{j: K_{1(j)} > D_s\}|, \quad k'_2 = k_2 - |\{j: K_{2(j)} > D_s\}|,$$
$$a_s = |K_1 \cap K_2|,$$
$$b_s = k'_1 - a_s,$$
$$c_s = k'_2 - a_s,$$
$$d_s = D_s - a_s - b_s - c_s.$$

Put differently, by employing the same corpus as in FIGS. 4 and 5, a procedure to construct sample contingency tables from sketches, $K_1$ and $K_2$ (box 611) can be illustrated. $K_1$ consists of the first $k_1$=7 document IDs in $P_1$; and $K_2$ consists of the first $k_2$=7 IDs in $P_2$. There are 11 IDs in both $P_1$ and $P_2$, and a=5 IDs in the intersection: {4, 15, 19, 24, 28}. In addition, $D_s$=min(8, 21)=18, and IDs 19 and 21 in $K_2$ are excluded from the sample because it cannot be determined if they are in the intersection or not, without looking outside the box 611. As it turns out, 19 is in the intersection and 21 is not. This procedure generates a sample contingency table: $a_s$=2, $b_s$=5, $c_s$=3 and $d_s$=8, the same as in FIGS. 4 and 5.

Although both Procedure 1 (in FIG. 5) and Procedure 2 (in FIG. 6) produce the same sample contingency tables as the conventional random sampling, they are different in that Procedure 1 requires a pre-specified corpus sampling size $D_s$ while Procedure 2 is more flexible. However, conditional on $D_s$, Procedure 2 is the same as Procedure 1. In one exemplar aspect, and to simplify the analysis, the estimation method of the subject innovation can be based on conditioning on $D_s$. After constructing the sample contingency tables, the maximum likelihood estimator (MLE) can estimate the most probable a by solving a cubic MLE equation of:

$$\frac{f_1 - a + 1 - b_s}{f_1 - a + 1} \frac{f_2 - a + 1 - c_s}{f_2 - a + 1} \frac{D - f_1 - f_2 + a}{D - f_1 - f_2 + a - d_s} \frac{a}{a - a_s} = 1. \quad (eq.\ 8)$$

Assuming "sample-with-replacement," one can have a slightly simpler cubic MLE equation as indicated by:

$$\frac{a_s}{a} \frac{b_s}{f_1 - a} \frac{c_s}{f_2 - a} + \frac{d_s}{D - f_1 - f_2 + a} = 0, \quad (eq.\ 9)$$

Instead of solving a cubic equation, one can also use an accurate closed-form approximation of:

$$\hat{a} = \frac{f_1(2a_s + c_s) + f_2(2a_s + b_s) - \sqrt{(f_1(2a_s + c_s) - f_2(2a_s + b_s))^2 + 4f_1 f_2 b_s c_s}}{2(2a_s + b_s + c_s)} \quad (eq.\ 10)$$

As will be described in detail infra, eq. 10 will be derived in detail in conjunction with an analysis of the estimation errors, (which is directly related to the variance of the estimator) and the following variance formulas (conditional on $D_s$):

$$\mathrm{Var}(\hat{a}) \approx \frac{\frac{D}{D_s} - 1}{\frac{1}{a} + \frac{1}{f_1 - a} + \frac{1}{f_2 - a} + \frac{1}{D - f_1 - f_2 + a}}. \quad (eq.\ 11)$$

And an approximate unconditional variance, useful for choosing sketch sizes:

$$\mathrm{Var}(\hat{a})_{uc} \approx \frac{\max\left(\frac{f_1}{k_1}, \frac{f_2}{k_2}\right) - 1}{\frac{1}{a} + \frac{1}{f_1 - a} + \frac{1}{f_2 - a} + \frac{1}{D - f_1 - f_2 + a}}. \quad (eq.\ 12)$$

Based on statistical large sample theory, such variance formulas are accurate when the sketch sizes are reasonable (e.g., ≧20-50).

The Proposed MLE of the Subject Innovation

In one exemplary aspect, the subject innovation estimates the contingency table from the samples, the margins, and D. The most probable a, which maximizes the (full) likelihood (probability mass function, PMF) ($a_s$, $b_s$, $c_s$, $d_s$; a) is desired. Even though, the exact expression for P($a_s$, $b_s$, $c_s$, $d_s$; a) is not known, the conditional (partial) probability P($a_s$, $b_s$, $c_s$, $d_s$|$D_s$; a) is known. Such is the PMF of a two-way sample contingency table, based on the sketch construction Procedure 2 in FIG. 6. Therefore, the full likelihood can be factored into:

$$P(a_s, b_s, c_s, d_s; a) = P(a_s, b_s, c_s, d_s | D_s; a) \times P(D_s; a). \quad \text{(eq. 13)}$$

Figure 7:
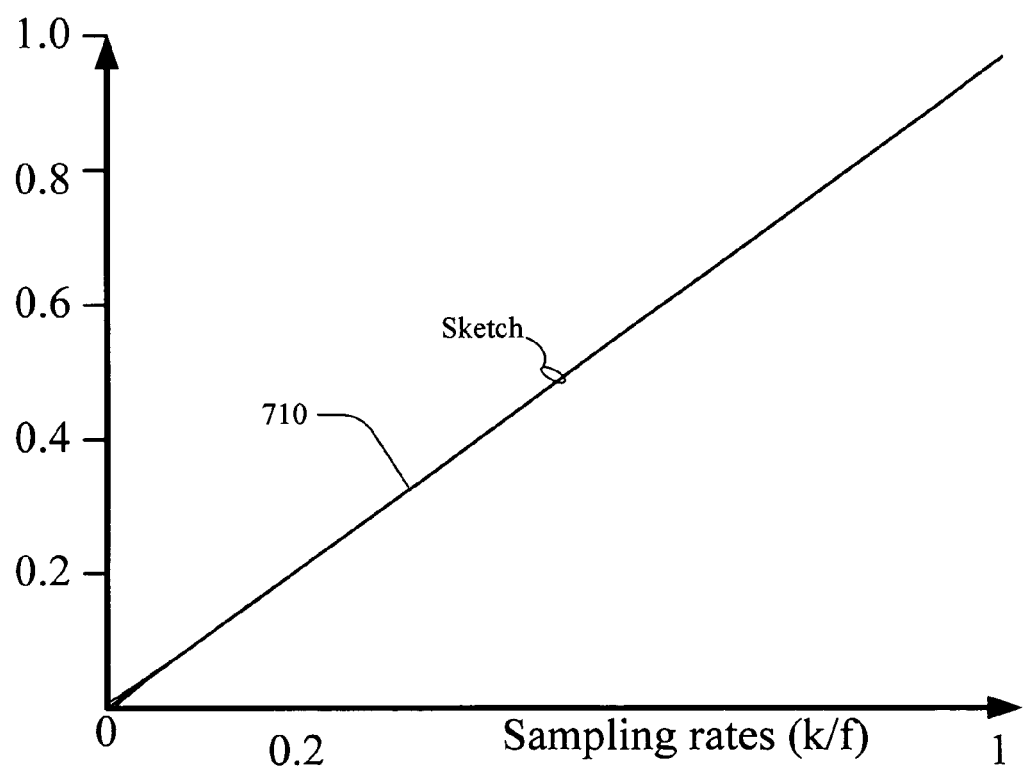
FIG. 7 illustrates an exemplary graph that shows lack of a strong dependency of documents in sample space ($D_s$), on the number of documents that contain both $W_1$ and $W_2$ in the sample space/sketch ($a_s$).

Since a strong dependency of $D_s$ on a (as illustrated in FIG. 7) is not present, a partial likelihood can also be employed which seeks the a that maximizes the partial likelihood P($a_s$, $b_s$, $c_s$, $d_s$|$D_s$; a) instead of the full probability. Such partial likelihood method is widely used is statistics (e.g., Cox proportional hazards model in survival analysis, and the like).

Conditional on $D_s$, the partial likelihood can be represented by:

$$P(a_s, b_s, c_s, d_s | D_s; a) = \frac{\binom{a}{a_s}\binom{b}{b_s}\binom{c}{c_s}\binom{d}{d_s}}{\binom{a+b+c+d}{a_s+b_s+c_s+d_s}} \quad \text{(eq. 14)}$$

$$= \frac{\binom{a}{a_s}\binom{f_1-a}{b_s}\binom{f_2-a}{c_s}\binom{D-f_1-f_2+a}{d_s}}{\binom{D}{D_s}} \propto$$

$$\frac{a!}{(a-a_s)!} \times \frac{(f_1-a)!}{(f_1-a-b_s)!} \times$$

$$\frac{(f_2-a)!}{(f_2-a-c_s)!} \times \frac{(D-f_1-f_2+a)!}{(D-f_1-f_2+a-d_s)!}$$

$$= \prod_{i=0}^{a_s-1}(a-i) \times \prod_{i=0}^{b_s-1}(f_1-a-i) \times$$

$$\prod_{i=0}^{c_s-1}(f_2-a-i) \times$$

$$\prod_{i=0}^{d_s-1}(D-f_1-f_2+a-i),$$

wherein, the multiplicative terms not mentioning a are discarded, as they typically will not contribute to the MLE.

Let $\hat{a}_{MLE}$ be the value of a that maximizes the partial likelihood (eq. 14), (or equivalently, maximizes the log likelihood,) then log P($a_s$, $b_s$, $c_s$, $d_s$|$D_s$; a) can be described as:

$$\sum_{i=0}^{a_s-1}\log(a-i) + \sum_{i=0}^{b_s-1}\log(f_1-a-i) +$$

$$\sum_{i=0}^{c_s-1}\log(f_2-a-i) + \sum_{i=0}^{d_s-1}\log(D-f_1-f_2+a-i),$$

whose first derivative, $$\frac{\partial \log P(a_s, b_s, c_s, d_s | D_s; a)}{\partial a},$$

is $$\sum_{i=0}^{a_s-1}\frac{1}{a-i} - \sum_{i=0}^{b_s-1}\frac{1}{f_1-a-i} - \quad \text{(eq. 15)}$$

$$\sum_{i=0}^{c_s-1}\frac{1}{f_2-a-i} + \sum_{i=0}^{d_s-1}\frac{1}{D-f_1-f_2+a-i}.$$

Since the second derivative, $$\frac{\partial^2 \log P(a_s, b_s, c_s, d_s | D_s; a)}{\partial a^2}$$

is, $$-\sum_{i=0}^{a_s-1}\frac{1}{(a-i)^2} - \sum_{i=0}^{b_s-1}\frac{1}{(f_1-a-i)^2} -$$

$$\sum_{i=0}^{c_s-1}\frac{1}{(f_2-a-i)^2} - \sum_{i=0}^{d_s-1}\frac{1}{(D-f_1-f_2+a-i)^2},$$

and negative, then the log likelihood function is concave, and therefore, there is a unique maximum. One could solve (eq. 15) for $$\frac{\partial \log P(a_s, b_s, c_s, d_s | D_s; a)}{\partial a} = 0$$

numerically, yet there exists an exact solution using the updated formula from (eq. 14), wherein:

$$P(a_s, b_s, c_s, d_s | D_s; a) = P(a_s, b_s, c_s, d_s | D_s; a-1) \times \quad \text{(eq. 16)}$$

$$\frac{a}{a-a_s} \frac{f_1-a+1-b_s}{f_1-a+1} \frac{f_2-a+1-c_s}{f_2-a+1}$$

$$\frac{D-f_1-f_2+a}{D-f_1-f_2+a-d_s}$$

$$= P(a_s, b_s, c_s, d_s | D_s; a-1) \times g(a).$$

Since it is known that the MLE exists and is unique, it suffices to find the a from g(a)=1, $$g(a) = \quad \text{(eq. 17)}$$

$$\frac{a}{a-a_s} \frac{f_1-a+1-b_s}{f_1-a+1} \frac{f_2-a+1-c_s}{f_2-a+1} \frac{D-f_1-f_2+a}{D-f_1-f_2+a-d_s} = 1,$$

which is cubic in a (the fourth term vanishes) and can be solved by Cardano formula. It is to be appreciated that numerical methods can also be employed. g(a)=1 is equivalent to q(a)=log g(a)=0. The first derivative of q(a) is $$q'(a) = \left(\frac{1}{f_1 - a + 1} - \frac{1}{f_1 - a + 1 - b_s}\right) + \qquad \text{(eq. 18)}$$
$$\left(\frac{1}{f_2 - a + 1} - \frac{1}{f_2 - a + 1 - c_s}\right) +$$
$$\left(\frac{1}{D - f_1 - f_2 + a} - \frac{1}{D - f_1 - f_2 + a - d_s}\right) + \left(\frac{1}{a} - \frac{1}{a - a_s}\right).$$

One can solve for q(a)=0 iteratively using the Newton's method, $$a^{(new)} = a^{(old)} - \frac{q(a^{(old)})}{q'(a^{(old)})}. \qquad \text{(eq. 19)}$$

As explained above, FIG. 7 illustrates that the multivariate hypergeometric sample $E(D_s)$ is not being sensitive to a, ($D=2\times10^7$, $f_1=D/20$, $f_2=f_1/2$.) The different curves correspond to a=0, 0.05, 0.2, 0.5 and 0.9 $f_2$. Such curves 710 are almost indistinguishable except at very low sampling rates. Moreover, it is to be appreciated that at a sampling rate of $10^{-5}$, the sample size is $k_2$=5.

Likewise, under the "sample-with-replacement" assumption, the likelihood function is slightly simpler as:

$$P(a_s, b_s, c_s, d_s | D_s; a, r) = \qquad \text{(eq. 20)}$$
$$\binom{D_s}{a_s, b_s, c_s, d_s}\left(\frac{a}{D}\right)^{a_s}\left(\frac{b}{D}\right)^{b_s}\left(\frac{c}{D}\right)^{c_s}\left(\frac{d}{D}\right)^{d_s} \propto$$
$$a^{a_s}(f_1 - a)^{b_s} - (f_2 - a)^{c_s}(D - f_1 - f_2 + a)^{d_s}.$$

Setting the first derivative of the log likelihood to be zero yields a cubic equation:

$$\frac{a_s}{a} - \frac{b_s}{f_1 - a} - \frac{c_s}{f_2 - a} + \frac{d_s}{D - f_1 - f_2 + a} = 0. \qquad \text{(eq. 21)}$$

In a related aspect of the subject innovation, a less accurate margin-free base line can be provided instead of solving a cubic equation for the exact MLE. Accordingly, a convenient closed-form approximation to the exact MLE is described below.

The "sample-with-replacement" can be assumed and $a_s$ can be identified from $K_1$ without the knowledge of $K_2$. Put differently, it can be assumed that:

$$a_s^{(1)} \sim \text{Binomial}\left(a_s + b_s, \frac{a}{f_1}\right), a_s^{(2)} \sim \text{Binomial}\left(a_s + c_s, \frac{a}{f_2}\right),$$
$$a_s^{(1)} \text{ and } a_s^{(2)}$$

are independent with $a_s^{(1)}=a_s^{(2)}=a_s$. The PMF of $(a_s^{(1)},a_s^{(2)})$ is a product of two binomials:

$$\left[\binom{f_1}{a_s + b_s}\left(\frac{a}{f_1}\right)^{a_s}\left(\frac{f_1 - a}{f_1}\right)^{b_s}\right] \times \left[\binom{f_2}{a_s + c_s}\left(\frac{a}{f_2}\right)^{a_s}\left(\frac{f_2 - a}{f_2}\right)^{c_s}\right] \propto \qquad \text{(eq. 22)}$$
$$a^{2a_s}(f_1 - a)^{b_s}(f_2 - a)^{c_s}.$$

Setting the first derivative of the logarithm of (eq. 22) to be zero, the following can be obtained $$\frac{2a_s}{a} - \frac{b_s}{f_1 - a} - \frac{c_s}{f_2 - a} = 0, \qquad \text{(eq. 23)}$$

which is quadratic in a and has a convenient closed-form solution:

$$\hat{a}_{MLE,a} = \frac{f_1(2a_s + c_s) + f_2(2a_s + b_s) - \sqrt{(f_1(2a_s + c_s) - f_2(2a_s + b_s))^2 + 4f_1 f_2 b_s c_s}}{2(2a_s + b_s + c_s)}. \qquad \text{(eq. 24)}$$

The second root can be ignored because it is always out of range:

$$\frac{f_1(2a_s + c_s) + f_2(2a_s + b_s) - \sqrt{(f_1(2a_s + c_s) - f_2(2a_s + b_s))^2 + 4f_1 f_2 b_s c_s}}{2(2a_s + b_s + c_s)} \geq$$
$$\frac{f_1(2a_s + c_s) + f_2(2a_s + b_s) - |f_1(2a_s + c_s) - f_2(2a_s + b_s)|}{2(2a_s + b_s + c_s)} \geq$$
$$\begin{matrix} f_1 \text{ if } f_1(2a_s + c_s) \geq f_2(2a_s + b_s) \\ f_2 \text{ if } f_1(2a_s + c_s) < f_2(2a_s + b_s) \end{matrix} \geq \min(f_1, f_2)$$

wherein, typically $\hat{a}_{MLE,a}$ is very close to $\hat{a}_{MLE}$. Thus, by enhancing the sampling procedure, the subject innovation can facilitate obtaining a better resolution, even though a more complex estimation can be required (e.g., a likelihood argument.)

Figure 8:
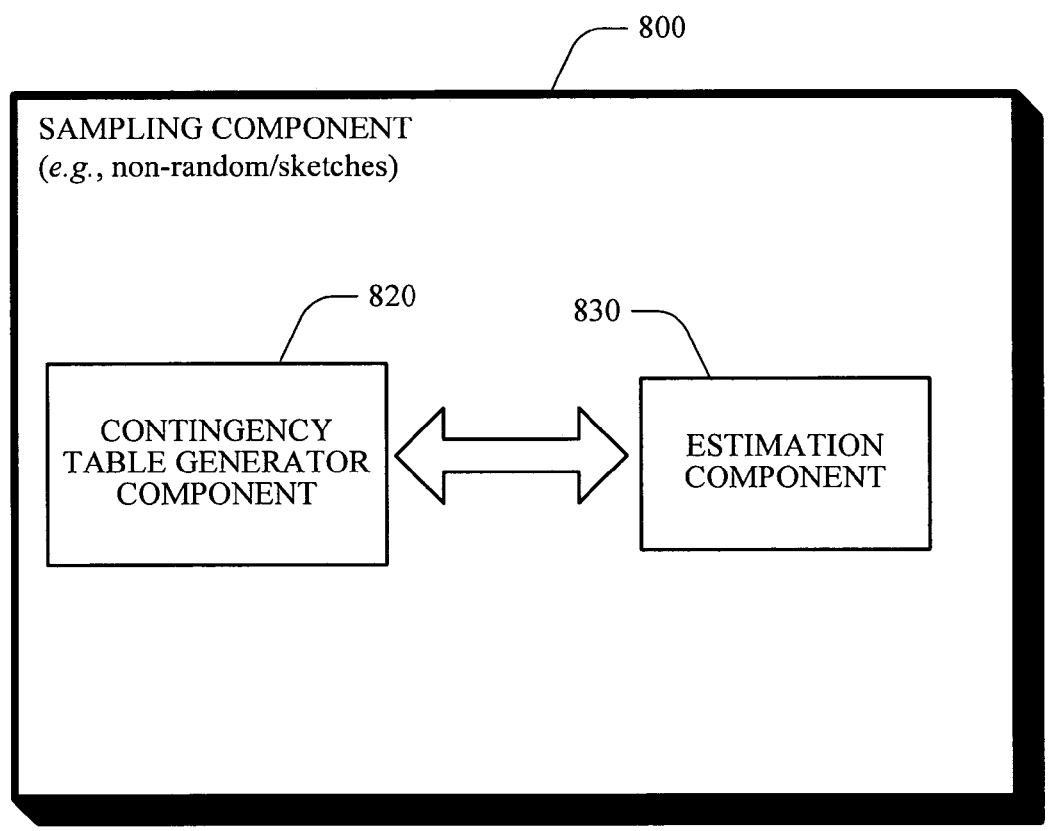
FIG. 8 illustrates an exemplary block diagram of a system that estimates word associations in accordance with an aspect of the subject innovation.

Referring now FIG. 8, there is illustrated an exemplary sampling component 800 that estimates contingency tables for designating data associations. The sampling component 800 can include a contingency table generator component 820, and an estimation component 830. The contingency table generator component 820 is programmed and/or configured to access stored data and construct corresponding contingency table(s) for designated word pair(s). The stored data can exist in a database having a plurality of records with associated fields populated by one or more processes or services over time, for example. Such data can be stored at one or more storage locations (local or remote) relative to the instance of the contingency table generator component 820. For the example of Web-related data, a server associated with the Web site may collect data based on forms submitted by the user, based on cookies associated with the user, and/or based on user log files. The server may, in turn, integrate the collected data with other data sources and organize such information according to a predetermined format. The estimation component 830 can then apply a probabilistic analysis to locate most likely contingency tables in the original space given the sketch and constraints explained in detail supra. As such, a typical requirement to examine an entire document (or list of documents) to determine whether two words are associated can be mitigated.

Figure 9:
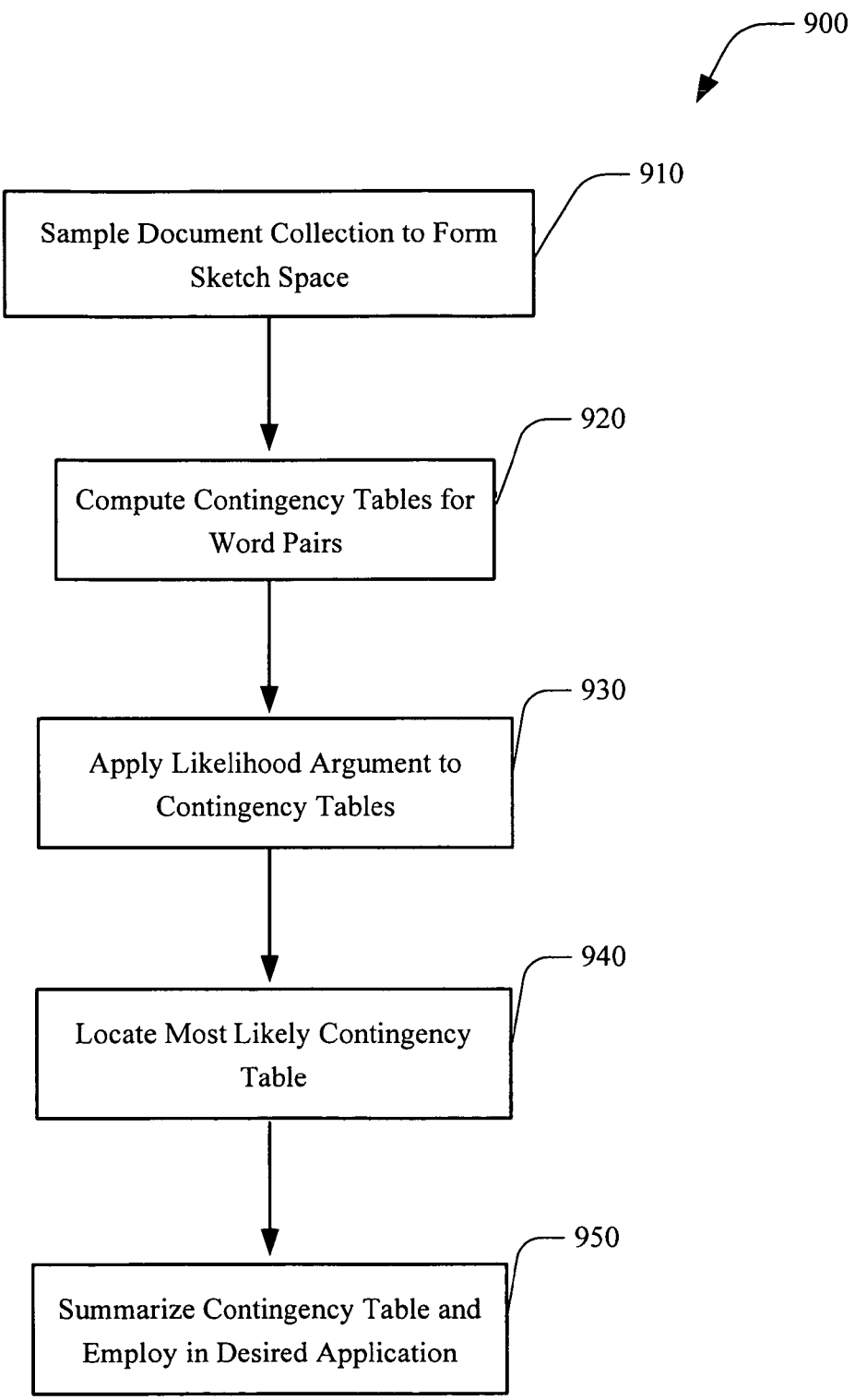
FIG. 9 illustrates an exemplary methodology of estimating contingency tables via sketches.

FIG. 9 illustrates an exemplary methodology 900 of studying associations in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially, and at 910 the word pairs are sampled for estimating associations. Subsequently and at 920, contingency tables are computed for the word pairs. A likelihood argument (e.g., maximum likelihood) can then be applied to the contingency tables, at 930. The most likely contingency table can then be located in the original space at 940, given the sketch and constraints. Subsequently, and at 950 the contingency tables can be summarized and employed in desired applications (e.g., word associations).

The subject innovation (e.g., in connection with estimating associations for word pairs) can employ various artificial intelligence based schemes for carrying out various aspects thereof. For example, a process for learning explicitly or implicitly when a contingency table should be generated can be facilitated via an automatic classification system and process. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

Figure 10:
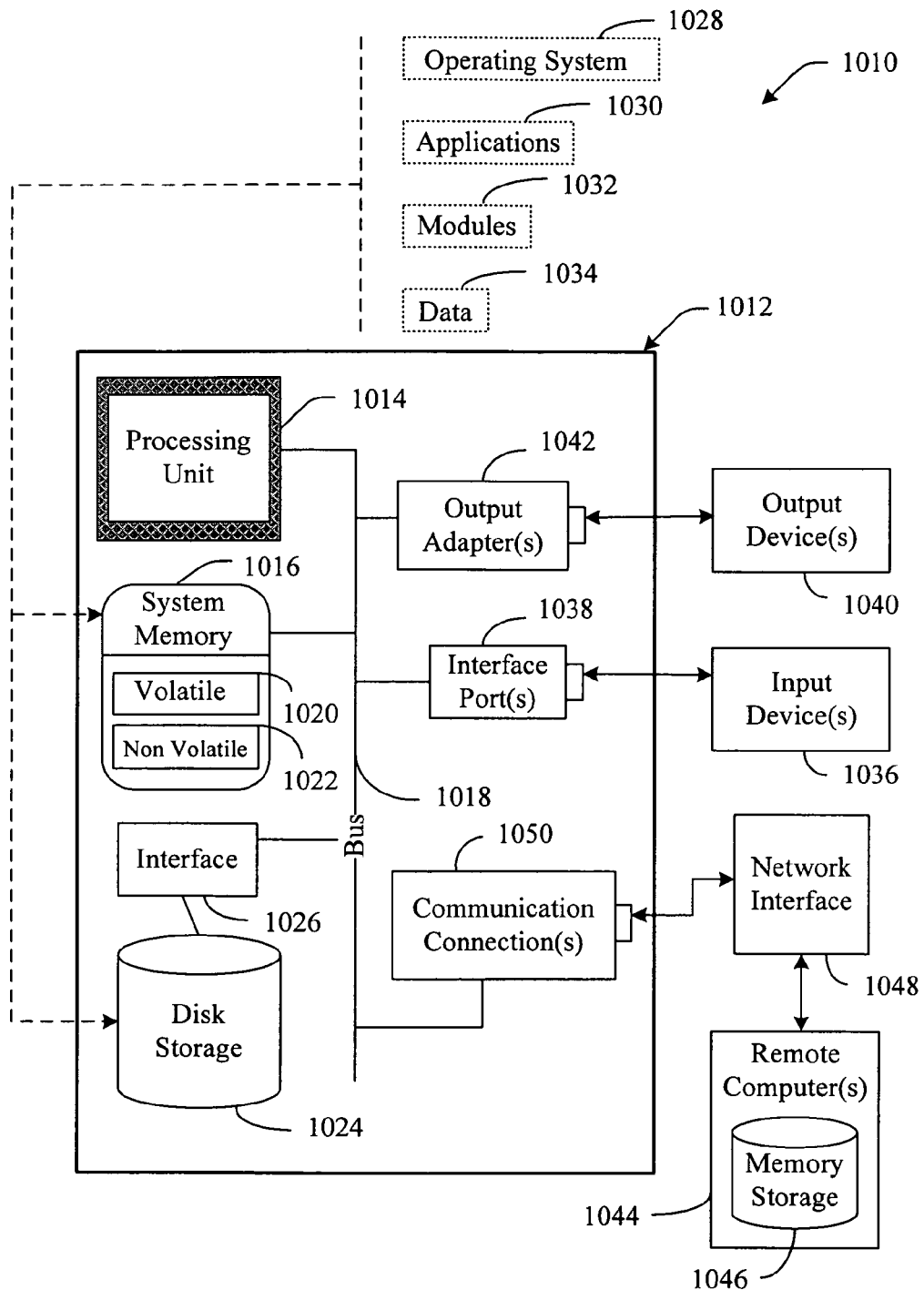
FIG. 10 illustrates an exemplary environment for implementing various aspects of the subject innovation.
Figure 11:
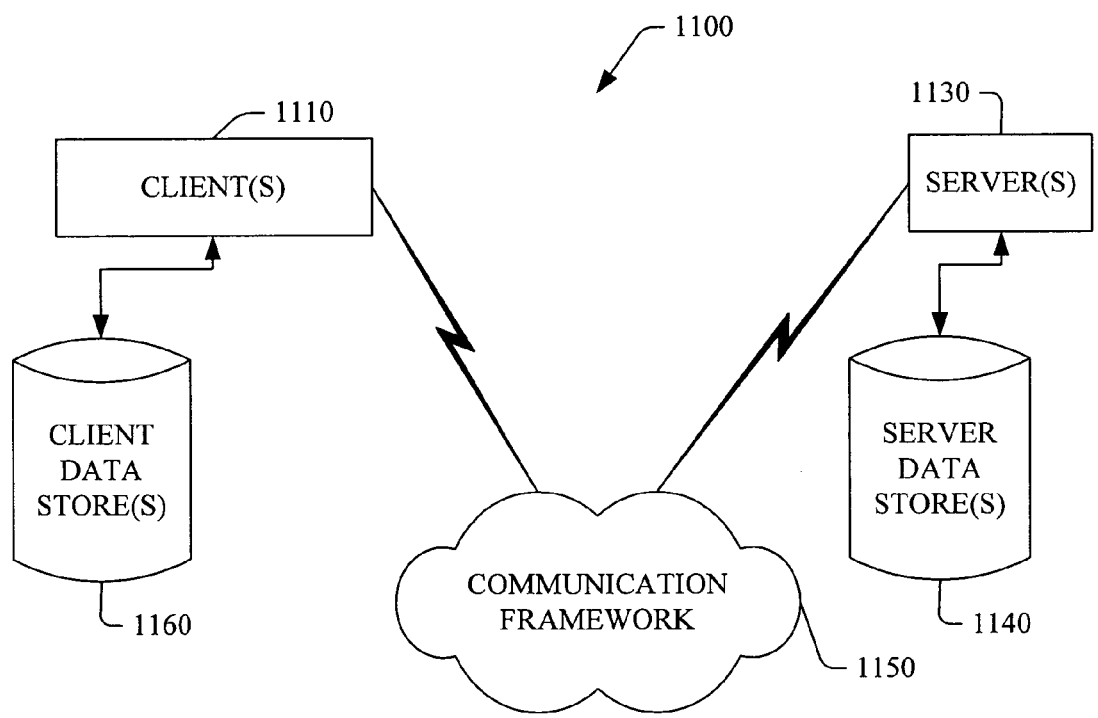
FIG. 11 is a schematic block diagram of an additional-computing environment that can be employed to implement the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed to examine associations via contingency tables in accordance with an aspect of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. For example, the subject innovation can be extended over two way associations to encompass multi-way associations. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
   a memory;
   a processor that executes the following software components;
   a sampling component that employs sketches to facilitate generation of contingency tables and forms a sample of data; and
   an estimation component that employs a probabilistic argument to locate a most likely contingency table for the sample;
   wherein the contingency tables comprise a sample intersection cell ($a_s$) that is equal to an intersection cell (a) multiplied by a sampling rate (s);
   wherein the processor finds and outputs to a computer display, estimates on word pair associations in searching document lists on a computer; and wherein the sketches employed to facilitate generation of the contingency tables comprise sketches $K_1$, $K_2$, and $$D_s = \min\{K_{1(k_1)}, K_{2(k_2)}\},$$
$$k_1' = k_1 - |\{j : K_{1(j)} > D_s\}|,$$
$$k_2' = k_2 - |\{j : K_{2(j)} > D_s\}|,$$
$$a_s = |K_1 \cap K_2|,$$
$$b_s = k_1' - a_s,$$
$$c_s = k_2' - a_s,$$
$$d_s = D_s - a_s - b_s - c_s.$$

wherein the most likely contingency table is determined via defining a maximum likelihood estimation as $$P(a_s, b_s, c_s, d_s | D_s; a, r) = \frac{\binom{a}{a_s}\binom{b}{b_s}\binom{c}{c_s}\binom{d}{d_s}}{\binom{a+b+c+d}{a_s+b_s+c_s+d_s}}$$
$$= \frac{\binom{a}{a_s}\binom{f_1-a}{b_s}\binom{f_2-a}{c_s}\binom{D-f_1-f_2+a}{d_s}}{\binom{D}{D_s}}.$$

and a closed form solution is presented in the form of $$\hat{a}_{MLE,a} = \frac{f_1(2a_s + c_s) + f_2(2a_s + b_s) - \sqrt{(f_1(2a_s + c_s) - f_2(2a_s + b_s))^2 + 4f_1 f_2 b_s c_s}}{2(2a_s + b_s + c_s)}.$$

2. The computer implemented system of claim 1, the estimation component further comprising a maximum likelihood estimation.

3. The computer implemented system of claim 2, further comprising a stopping rule that is based on the likelihood estimation.

4. The computer implemented system of claim 1, further comprising an artificial intelligence component that facilitates estimation of word associations, via utilizing an automatic classification system that learns explicitly or implicitly when the contingency tables should be generated, wherein the classification system employs a probabilistic and/or statistical-based analysis to infer an action that a user desires to be automatically performed.

5. A computer implemented method comprising the following computer executable acts:
  sampling a collection of data to form a sample space;
  computing a contingency table within the sample space for features that require association estimation;
  employing sketches to facilitate generation of the contingency table and to form a sample of data;
  employing a probabilistic argument on the contingency table to determine the most likely contingency table;
  employing a linear relation between a sample intersection cell and a sampling rate, wherein the contingency table comprises a sample intersection cell ($a_s$) that is equal to an intersection cell (a) multiplied by a sampling rate (s);

finding and outputting estimates on word pair associations in searching document lists on a computer;
employing $$D_s = \min\{K_{1(k_1)}, K_{2(k_2)}\},$$
$$k_1' = k_1 - |\{j : K_{1(j)} > D_s\}|,$$
$$k_2' = k_2 - |\{j : K_{2(j)} > D_s\}|,$$
$$a_s = |K_1 \cap K_2|,$$
$$b_s = k_1' - a_s,$$
$$c_s = k_2' - a_s,$$
$$d_s = D_s - a_s - b_s - c_s$$

for sketches $K_1$, $K_2$;
determining the most likely contingency table via defining a maximum likelihood estimation as $$P(a_s, b_s, c_s, d_s | D_s; a, r) = \binom{D_s}{a_s, b_s, c_s, d_s}\left(\frac{a}{D}\right)^{a_s}\left(\frac{b}{D}\right)^{b_s}\left(\frac{c}{D}\right)^{c_s}\left(\frac{d}{D}\right)^{d_s} \propto$$
$$a^{a_s}(f_1-a)^{b_s} - (f_2-a)^{c_s}(D-f_1-f_2+a)^{d_s};$$

and presenting a closed form solution in form of $$\hat{a}_{MLE,a} = \frac{f_1(2a_s + c_s) + f_2(2a_s + b_s) - \sqrt{(f_1(2a_s + c_s) - f_2(2a_s + b_s))^2 + 4f_1 f_2 b_s c_s}}{2(2a_s + b_s + c_s)}.$$

6. The method of claim 5 further comprising employing a maximum likelihood estimation.

7. The method of claim 5 further comprising employing variances based on document frequencies.

8. The method of claim 5 further comprising representing a partial likelihood as $$P(a_s, b_s, c_s, d_s | D_s; a) =$$
$$\frac{\binom{a}{a_s}\binom{b}{b_s}\binom{c}{c_s}\binom{d}{d_s}}{\binom{a+b+c+d}{a_s+b_s+c_s+d_s}} = \frac{\binom{a}{a_s}\binom{f_1-a}{b_s}\binom{f_2-a}{c_s}\binom{D-f_1-f_2+a}{d_s}}{\binom{D}{D_s}}.$$

9. The method of claim 8 further comprising presenting a solution as:

$$g(a) = \frac{a}{a-a_s}\frac{f_1-a+1-b_s}{f_1-a+1}\frac{f_2-a+1-c_s}{f_2-a+1}\frac{D-f_1-f_2+a}{D-f_1-f_2+a-d_s}$$
$$= 1.$$

10. A computer implemented system comprising the following computer executable components:
  means for sampling a collection of documents to form a sample space;
  means for computing a contingency table within the sample space;

means for employing sketches to facilitate generation of the contingency table and to form a sample of data;

means for employing a probabilistic argument on the contingency table to determine the most likely contingency table;

means for employing a linear relation between a sample intersection cell and a sampling rate, wherein the contingency table comprises a sample intersection cell ($a_s$) that is equal to an intersection cell (a) multiplied by a sampling rate (s);

means for finding and outputting estimates on word pair associations in using the sample intersection cell and the sampling rate;

means for employing $$D_s = \min\{K_{1(k_1)}, K_{2(k_2)}\},$$

$$k'_1 = k_1 - |\{j : K_{1(j)} > D_s\}|, k'_2 = k_2 - |\{j : K_{2(j)} > D_s\}|,$$

$$a_s = |K_1 \cap K_2|, b_s = k'_1 - a_s, c_s = k'_2 - a_s, d_s = D_s - a_s - b_s - c_s$$

for sketches K1, K2;

means for determining the most likely contingency table via defining a maximum likelihood estimation as $$P(a_s, b_s, c_s, d_s \mid D_s; a, r) = \binom{D_s}{a_s, b_s, c_s, d_s} \left(\frac{a}{D}\right)^{a_s} \left(\frac{b}{D}\right)^{b_s} \left(\frac{c}{D}\right)^{c_s} \left(\frac{d}{D}\right)^{d_s} \propto$$

$$a^{a_s}(f_1 - a)^{b_s} - (f_2 - a)^{c_s}(D - f_1 - f_2 + a)^{d_s};$$

and means for presenting a closed form solution in form of $$\hat{a}_{MLE,a} = \frac{f_1(2a_s + c_s) + f_2(2a_s + b_s) - \sqrt{(f_1(2a_s + c_s) - f_2(2a_s + b_s))^2 + 4f_1 f_2 b_s c_s}}{2(2a_s + b_s + c_s)}.$$

* * * * *

UNITED STATES PATENT AND TRADEMARK OFFICE
CERTIFICATE OF CORRECTION

PATENT NO. : 7,536,366 B2
APPLICATION NO. : 11/319992
DATED : May 19, 2009
INVENTOR(S) : Kenneth Ward Church et al.

Page 1 of 2

It is certified that error appears in the above-identified patent and that said Letters Patent is hereby corrected as shown below:

In column 8, line 11, before "which" insert -- exactly, --.

In column 19, line 14, in Claim 1, delete " $d_s = D_s - a_s - b_s - c_s.$ "

and insert -- $d_s = D_s - a_s - b_s - c_s$ --, therefor.

In column 19, lines 19-21, in Claim 1, delete

"
$$P(a_s, b_s, c_s, d_s \mid D_s; a, r) = \frac{\binom{a}{a_s}\binom{b}{b_s}\binom{c}{c_s}\binom{d}{d_s}}{\binom{a+b+c+d}{a_s+b_s+c_s+d_s}}$$

$$= \frac{\binom{a}{a_s}\binom{f_1-a}{b_s}\binom{f_2-a}{c_s}\binom{D-f_1-f_2+a}{d_s}}{\binom{D}{D_s}}$$
"

Signed and Sealed this
Twelfth Day of July, 2011

David J. Kappos
*Director of the United States Patent and Trademark Office* and insert $$P(a_S,b_S,c_S,d_S \mid D_S;a,r) = \begin{pmatrix} D_S \\ a_S, b_S, c_S, d_S \end{pmatrix} \left(\frac{a}{D}\right)^{a_S} \left(\frac{b}{D}\right)^{b_S} \left(\frac{c}{D}\right)^{c_S} \left(\frac{d}{D}\right)^{d_S}$$

-- $\propto a^{a_s} (f_1 - a)^{b_s} - (f_2 - a)^{c_s} (D - f_1 - f_2 + a)^{d_s};$ --, therefor.

In column 22, line 1, in Claim 10, delete "K1, K2;" and insert -- $K_1$, $K_2$; --, therefor.